Dec. 18, 1962   S. C. ARGYLE   3,068,740
OPTICAL SCANNING DEVICE
Filed March 23, 1959   3 Sheets-Sheet 1
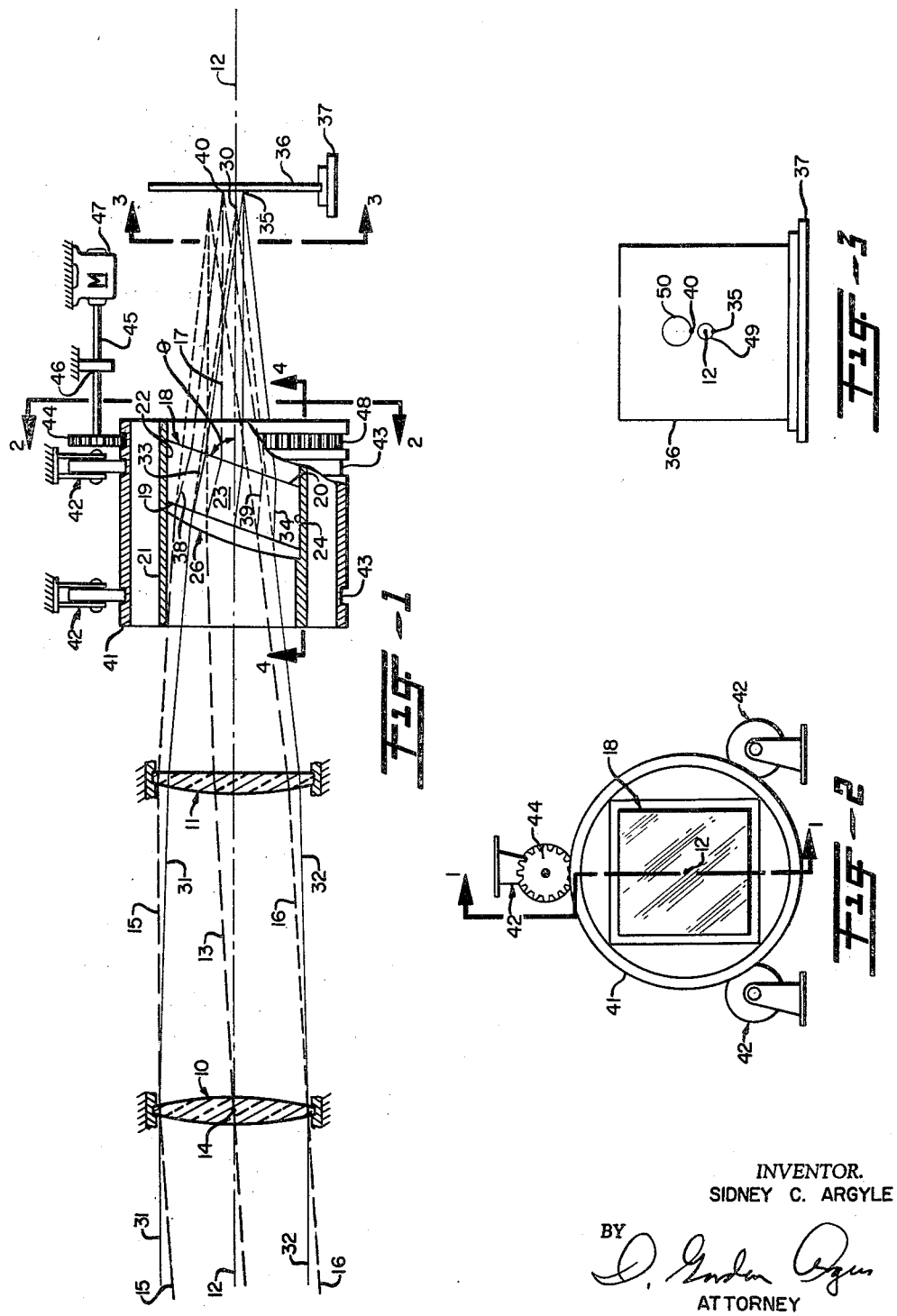
INVENTOR.
SIDNEY C. ARGYLE
BY
ATTORNEY Dec. 18, 1962 S. C. ARGYLE 3,068,740
OPTICAL SCANNING DEVICE
Filed March 23, 1959 3 Sheets-Sheet 2

INVENTOR.
SIDNEY C. ARGYLE
BY
ATTORNEY

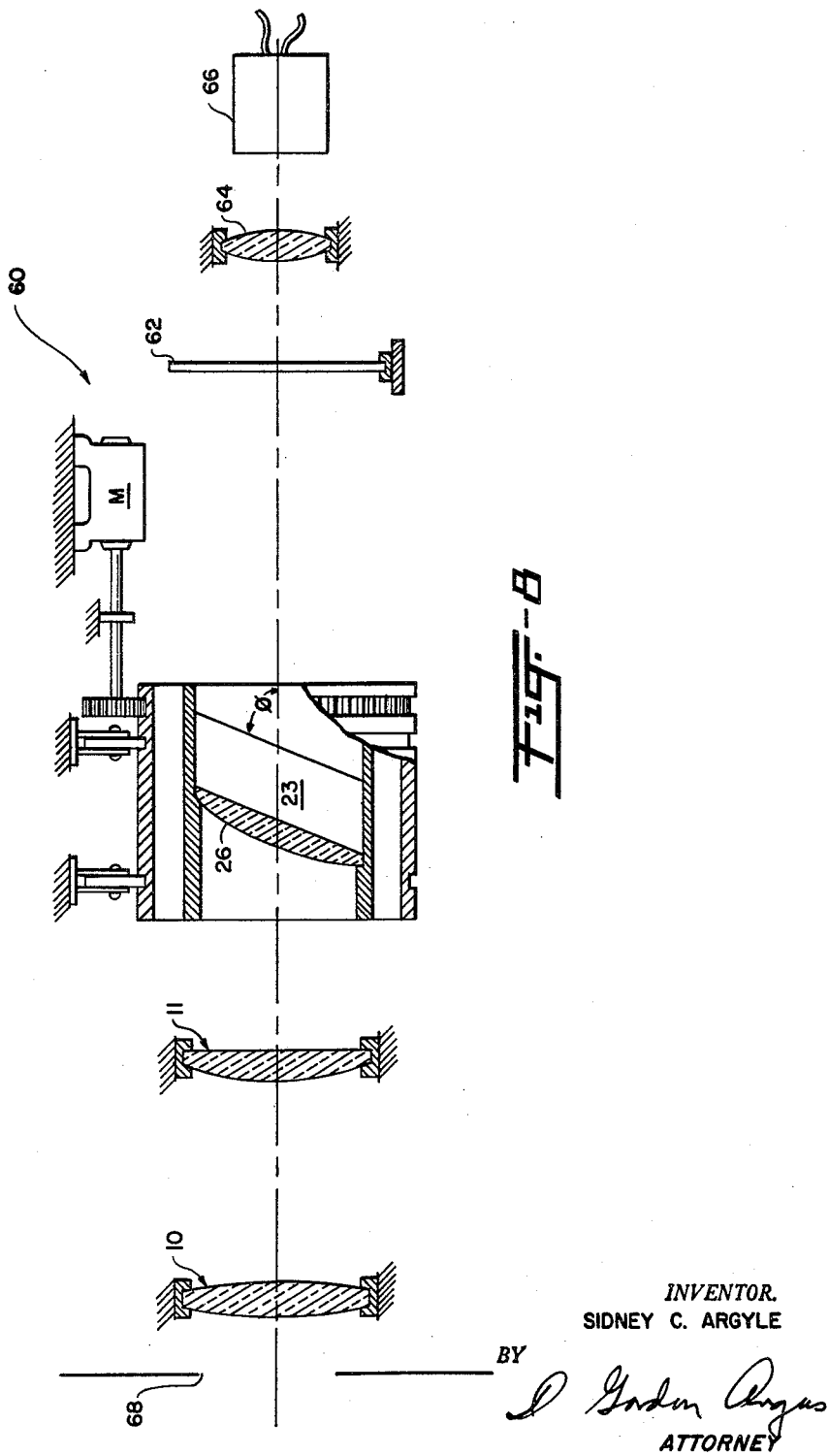

United States Patent Office 3,068,740
Patented Dec. 18, 1962

3,068,740
OPTICAL SCANNING DEVICE
Sidney C. Argyle, Glendora, Calif., assignor to Aerojet-General Corporation, Azusa, Calif., a corporation of Ohio
Filed Mar. 23, 1959, Ser. No. 801,397
8 Claims. (Cl. 88—1)

This invention relates to optical systems and more particularly to image nutator optical systems.

An object of the invention is to provide an optical device which can shift each point in the image plane, without appreciable aberrations, in such a manner that an approximately circular locus path is clearly described by each point image about a geometric mean position.

There are many applications, particularly in scanning, sighting and aiming devices, wherein a point or dot indication might be overlooked because it is too dim, or because it is too blurred. In many cases, a circular indication, which contrasts with a random background on account of its distinctive shape, would not be overlooked, even if quite dim. In particular, for optical guidance systems the use of such a circular scan makes possible the extraction of more accurate and useful information concerning the target position than can be obtained by other scanning means. Previous attempts to create a simple means for rotating a bundle of image-forming rays so as to create a circular indication have failed, largely because the refracting elements used for displacing the rays so that they will move in a circle have introduced intolerable aberrations into the system so that a blurred and often useless image resulted.

This invention provides an optical system having light-transmitting elements in the optical path which displace, by refraction, the rays forming each point image. These elements are rotated so as to move the image produced in a circular path. Aberration introduced by the said elements is compensated for in the present invention by a compensator which rotates with these elements.

This invention also preferably includes a collimating lens. An additional preferred feature of this invention resides in a corrective or compensating lens in the optical path which is designed to eliminate aberration introduced by the refracting means. The collimating lens in conjunction with the compensator has the effect of making each principal ray which enters the optical system through the optical center of its aperture parallel to the optical axis of the system, and minimizes distortion of the circular scan for off axis object points and in addition because they cause the entrance aperture to be imaged at infinity motion of the system exit pupil, as the nutator rotates, is prevented.

A feature of this invention resides in a refracting means positioned in the optical path of the optical system and rotatable so that its light incident surface and its light discharging surface have a constant angular relationship with respect to the optical axis of the optical system.

These and other features of the invention will be fully understood from the following detailed description and accompanying drawings of which:

FIG. 1 is a side view, partly in cutaway cross-section of an optical system according to the invention;

FIG. 2 is a cross-section taken at line 2—2 in FIG. 1;

FIG. 3 is a cross-section taken at line 3—3 in FIG. 1;

FIG. 8 is a side view partly in cut-away cross-section of a modified optical system according to this invention.

Figure 4:
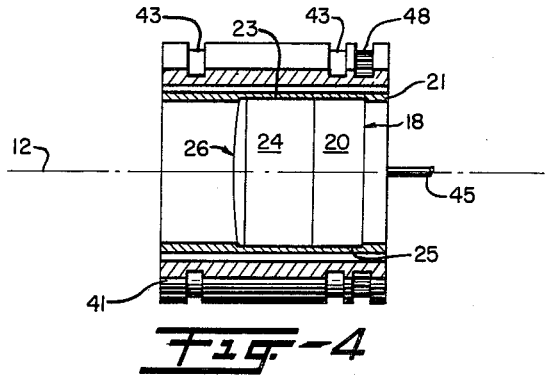
FIG. 4 is a cross-section view taken at line 4—4 in FIG. 1.

In FIG. 1 there is shown an optical system having a convergent objective lens 10 constituting its entrance aperture. The lens 10 is located at the object end of the optical system, which is at the left end of FIG. 1. A collimating lens 11 located farther from the object end of the optical system is also provided. The lens 10 and the lens 11 are each located on the optical axis 12 of the optical system. The purpose of the lens 11, in conjunction with a corrector lens 26, is to make each principal ray 13, one of which is shown in FIG. 1, through the optical center 14 of the objective lens 10 parallel to the optical axis 12 after emerging from a plane parallel plate 18. The principal rays of non-axial point objects are made parallel to the optical axis 12 of the optical system by lens 11 in conjunction with the corrector lens 26. Lines 15 and 16 represent two rays from a "bundle" of rays emanating from a non-axial object. A line 17 represents the principal ray 13 which is parallel to the optical axis 12 after having passed through the collimating lens 11, corrector lens 26 and the plane parallel plate 18.

The plane parallel transparent plate 18 is located on the optical axis 12 adjacent to the collimating lens 11 on the side opposite the object end of the system. The plate 18 which may be made of glass, plastic, or the like, has two major light-transmitting surfaces 19 and 20 which are parallel to one another and which are set at a fixed angle $\theta$ with respect to the optical axis 12 by mounting the plate 18 in a frame 21. The angle of inclination $\theta$ of the plate 18 is some suitable angle which is dependent on the amount of refraction desired and the type of material and the thickness of the plate 18.

The major surfaces 19 and 20 of the plate 18 are connected by four minor surfaces of which three, identified by the numbers 22, 23 and 24, are shown in FIG. 1. A fourth minor surface 25 is shown in FIG. 4. The four minor surfaces 22, 23, 24 and 25 are in contact with the frame 21 which holds the plate 18. The lens 26 as shown is contacted to the surface 19 of the plate 18. The lens 26 is a convergent lens of the type which will compensate for aberration ordinarily introduced by the plate 18. The plate 18 will introduce a considerable amount of aberration if the ratio of focal length to aperture of the objective lens 10 is small. Such an inclined plate 18, when placed in a convergent light, i.e., between the objective lens and its focal plane, gives rise to image aberrations. For one position of the focal plane a point object on the optical axis is imaged as a line 27 which is radial to the system's optical axis. When the tilted plane is rotated with respect to the optical axis, this line rotates about the optical axis. This situation in shown in FIG. 5. Rotation of a point object on such a system's optical axis 12' appears as a line 27 which is radial to the system's optical axis. The line 27 rotates about the optical axis when the tilted plate is rotated with respect to the optical axis. Rotation in the image plane is represented by the arrows 51 and 52 around the axis 12'.

Figure 5:
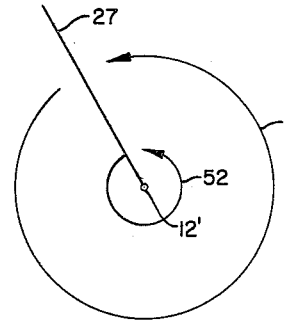
FIGS. 5, 6 and 7 are plan views of an image plane illustrating the operation of the invention.
Figure 6:
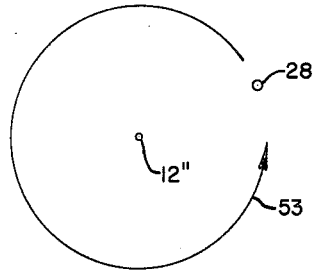

FIG. 6 shows an image plane for an optical system comprising a rotating plate tilted with respect to the optical axis, a convergent objective lens and a rotating tilted lens, such as the lens 26, which compensates for aberration due to the system's rotating tilted plate as shown in FIG. 5. A point object on the optical axis 12" of such a compensated system has an image which appears as a point image 28, at any particular moment. Rotation in the image plane shown in FIG. 6 is represented by the arrow 53. The point image 28 rotates about the optical axis when the tilted plate and tilted compensating lens are rotated with respect to the optical axis.

Figure 7:
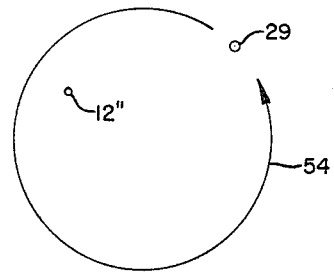

In FIG. 7, there is shown the image plane for the optical system of FIG. 6 as it would appear for a point object located off the system's optical axis 12". The image of such a point object rotates in a substantially circular path having a geometric mean position displaced from the system's optical axis 12″. Rotation of the point image 29 is represented in FIG. 7 by the arrow 54. Departure of the path 54 from circularity depends on the distance of the object from the optical axis and the percentage of collimation accomplished by the collimating lens 11 relative to the collimation effect of the corrector lens 26. In any case, this departure has been found to be negligible for those cases considered. (The term "collimation" and the phrase "making the principal rays parallel to the optical axis" are used interchangeably.)

In an optical system comprising only a convergent lens, such as the objective lens 10 and collimator 11, and not having a tilted plate, such as the plate 18, or a tilted lens, such as the lens 26, a point image of an axial point object on the system's optical axis would be formed closer to such an objective lens, for example, the position 30 shown in FIG. 1 on the optical axis. The effect of introduction of the tilted plate 18 and the tilted lens 26 is to refract light rays, due to the inclined angle $\theta$ in FIG. 1, relative to the optical axis at which they are disposed. The tilted plate 18 and the tilted lens 26 also increase the distance between the objective lens 10 and the image plane of such an optical system.

A bundle of rays, represented by the lines 31 and 32 from a point object on the optical axis 12 has a principal ray on the optical axis 12. These rays for the axial point object, represented by the lines 31 and 32, are converged by the objective lens 10, the lens 11 and the tilted lens 26. The tilted lens 26 and the plate 18 refract the rays 31 and 32 as shown by the portions of these converging rays represented by the lines 33 and 34. The refracted rays 33 and 34 emerge from the plate 18 through the surface 20 and converge to form at 35 a point image on a screen 36. The point image at 35 is laterally displaced from the optical axis. The screen 36 is located at the focal plane where the point image is formed at 35. A base 37 is provided to hold the screen 36 in the focal plane.

A bundle of rays 15 and 16 emanating from a non-axial object point are converged by the objective lens 10, the lens 11 and the tilted lens 26. The tilted lens 26 and the plate 18 refract the rays 15 and 16 as shown by the portions of these rays represented by the lines 38 and 39 through the tilted lens 26 and the plate 18. The rays emerge from the plate 18 through the surface 20 and converge to form a point image 40 on the screen 36.

The rays of each beam intersect on the screen 36 at the focal plane and displaced laterally due to refraction by the tilted plate 18 and the tilted lens 26. The amount of such displacement depends primarily upon the refractive index, inclination angle and the thickness of the plate 18 and to a smaller extent upon refraction due to the lens 26.

The lens 26 is also mounted in the frame 21 with the side of the lens toward the image plane against the inclined surface 19 of the plate 18, although it is to be understood that it could be somewhat separated from the surface 19. The frame 21 with the mounted plate 18 and the mounted lens 26 is disposed in such a manner that the plate 18 and the lens 26 remain properly oriented at whatever inclined angle $\theta$ with respect to the optical axis 12 may be chosen. An enclosing barrel 41 having the optical axis 12 as its axis is provided around the frame 21.

The barrel 41 which is concentric around the optical axis 12 may be rotated about the optical axis upon rollers 42 shown in FIGS. 1 and 2. The rollers 42 travel in roller grooves 43 provided on the barrel 41. A gear 44 is mounted on an axle 45 which passes through a journal 46 to a motor 47. The gear 44 is in contact with a groove 48 on the barrel 41 which is provided with gear teeth as shown in FIGS. 1 and 4.

FIG. 3 shows image locus 49 represented by a circular line concentric around the optical axis 12 on the screen 36. The locus 49 represented by the circular line is the path followed by the axial object's point image formed at the position 35 when the barrel 41 and its contained plate and lens is in the position of rotation shown in FIG. 1. An image locus 50 represented by a substantially circular line represents the path followed by the non-axial object's point image formed at the position 40, when the barrel 41 and its contained plate and lens is in the position shown in FIG. 1.

Suitable typical dimensions and materials for this device are as follows: lens 11, "$n$" equals 1.88, lens 11 object facing surface radius equals 11.6 inches, and lens 11 image facing surface radius equals infinity; lens 26, "$n$" equals 1.50, and lens 26 object facing surface radius equals 3.4 inches; and plate 18, "$n$" equals 1.88, and in conjunction with the lens 26 the plate 18 is inclined at an angle of 12 degrees. The objective lens 10 may comprise any convergent lens suitable for use with the foregoing optical elements with the above dimensions. Normally the objective lens 10 will comprise several elemenas as is usual in the design of such a lens, and would normally be designed in conjunction with lenses 11 and 26, and inclined plate 18.

It will be understood that the foregoing data and dimensions are given only by way of example, and not of limitation.

The optical system is operated in the following manner. The motor 47 is started and rotates the barrel 41 and the plate 18 and the tilted lens 26 about the optical axis 12. When the axis 12 is pointed near enough to an object so that the object is in the field of objective lens 10, then rays of radiant energy such as light rays, which are a form of electromagnetic rays, from an axial point, represented by the lines 31 and 32 enter the objective lens 10, and pass from it through the collimating lens 11 and the tilted lens 26, all of which converge the rays. The tilted lens 26 and the plate 18 refract the convergent rays of the light beam so that the rays are brought to focus at the point image 35 on the screen 36 displaced from the optical axis 12. The rotation of the barrel 41 and the tilted lens 26 and the plate 18 causes the image point formed at 35 to follow the circular locus path 49 on the screen 36 about the geometric mean position of the locus path 49. The geometric mean position of an image point for an axial point object is at the optical axis 12 on the screen 36.

Rays from a non-axial object, represented by the lines 15 and 16 enter the field lens 10, and then pass through the collimating lens 11 and the tilted lens 26, all of which converge the rays. The tilted lens 26 and the plate 18 refract the convergent rays of the light beam so that rays are brought to focus in a point image at 40 on the screen 36. The rotation of the tilted lens 26 and the plate 18 about the optical axis 12 causes the point image formed at 40 to follow the substantially circular locus path 50 on the screen 36. The locus path 50 is substantially concentric about the geometric means position of locus path of the image point. The geometric mean position of the image is representative of the position of the non-axial object in the object field.

Therefore any object point in the field of the instrument is displayed in the image plane as a substantially circular locus path centered on its geometric mean position in the field.

Image aberrations introduced by apparatus of this invention are negligible, especially when the apparatus and the objective lens 10 are designed to be compatible. The moving parts are of lightweight construction and require only a simple rotary motion, both of which features are especially suitable for maintaining proper adjustment and operation of the apparatus. The optical system works well for all image positions in the focal plane both for axial and non-axial objects. In addition, since the exit pupil of the system is at infinity by virtue of the choice of powers for the collimating lens 11 and tilted lens 26, it is possible to form a stationary image of the entrance aperture, that is, the area of the objective lens, on a screen or other surface by means of a lens between the focal plane and said screen even though the tilted lens and tilted plate are rotated together about the optical axis 12. This characteristic makes possible the concentration of all the radiant energy entering the objective lens on a smaller area than would be possible otherwise.

Each point in the image plane of the optical system describes an approximately circular path about a mean position, which enables more accurate information concerning the position of a point object to be obtained especially in those cases where it is necessary to have an opaque centre to the screen when in the form of a reticle. In optical detecting devices where a reticle and a photoelectric detector are used to detect a target and provide guidance or gun-laying information much greater accuracy can be obtained than with the conventional rotating reticle type of scan.

In the embodiment shown in FIGURE 8, the optical system indicated by the reference numeral 60 is exactly like the optical system shown in FIGURE 1, except that screen 36 at the focal plane in FIGURE 1 is replaced in FIGURE 8 by a conventional reticle 62. A field lens 64 and a radiation responsive device 66 are disposed behind the reticle in the order shown. The remaining parts of the optical system of FIGURE 8 have been numbered the same as the optical system shown in FIGURE 1 to indicate identity of function. The arrangement shown in FIGURE 8 images the entrance aperture 68 of the optical system 60 on the radiation-responsive device 66 so that the surface of the radiation-responsive device is uniformly illuminated by radiation passing through the reticle. This prevents the circularly moving image passing through the reticle from scanning the surface of the radiation-responsive device and thereby introducing spurious signals in its output.

It is to be understood that the form of the invention herewith shown and described is to be taken as a preferred example of the same, and that various changes in the shape, size, and arrangement of the parts may be resorted to without departing from the spirit of this invention or the scope of the claims.

I claim:

1. An optical system comprising: an objective lens, a collimating lens and a third lens all arranged along an optical axis of the system, said collimating lens acting as a collimator for principal rays passing through the optical center of said objective lens, said third lens being inclined at an angle to said optical axis, said collimating lens in conjunction with the third lens causing the principal rays to be parallel to the optical axis, a transparent plate located along said axis and having light transmission surfaces parallel to one another and inclined at an angle to said optical axis, said third lens and said inclined plate each being inclined at any instant at the same angle and direction relative to the optical axis, and means for rotating said third lens and said inclined plate about said optical axis.

2. Apparatus according to claim 1 in which said means for rotating said third lens and inclined plate comprises a frame and a barrel, said frame holding said third lens and said inclined plate within said barrel and a motive means for rotating said barrel about said optical axis.

3. An optical system comprising: an objective lens, a collimating lens and a third lens all arranged along an optical axis of the system, said collimating lens acting as a collimator for principal rays passing through the optical center of said objective lens, said collimated principal rays being parallel to said optical axis, said third lens being inclined at an angle to said optical axis, a transparent plate, located along said axis and having light transmission surfaces parallel to one another and inclined at an angle to said optical axis, said third lens and said inclined plate each being inclined at any instant at the same angle and direction relative to the optical axis; means for rotating said third lens and said inclined plate about said optical axis, and means for displaying images formed as a result of light traversing said objective lens, said collimating lens, said third lens and said inclined plate of said optical system.

4. An optical system comprising: an objective lens arranged on an optical axis of the system, a second lens disposed on said optical axis at an inclined angle to said optical axis; a transparent plate disposed on said optical axis at an inclined angle to said optical axis which is equal in magnitude to the angle of said second lens, said second lens and said transparent plate both being inclined in the same direction, means for rotating said second lens and said transparent plate about said optical axis together, said second lens being so disposed and arranged as to compensate for aberration introduced by said transparent plate and being so disposed and arranged as to make principal rays entering said optical system through its optical center parallel to said optical axis of the system.

5. Apparatus according to claim 4 in which said means for rotating said second lens and said transparent plate comprises: a frame; a barrel, said frame holding said second lens and said transparent plate within said barrel and a motive means for rotating said barrel about said optical axis.

6. An optical system having an entrance aperture and an optical axis, comprising: an objective lens; a collimating lens, said collimating lens and objective lens being disposed on said optical axis for said optical system, said collimating lens acting as a collimator for principal rays passing through the optical center of said objective lens; a third lens disposed in said optical system at an inclined angle to said optical axis, said collimating lens in conjunction with the lens inclined at an angle causing the principal rays to be parallel to the optical axis, a transparent plate, said plate having light transmission surfaces parallel to one another and inclined at an angle to said optical axis, said third lens and said inclined plate each being inclined at any instant at the same angle and direction relative to the optical axis; means for rotating said third lens and said inclined plate about said optical axis; a device responsive to electromagnetic radiation; and a fourth lens arranged between said responsive device and said inclined plate, whereby the image of the entrance aperture is focused upon said responsive device.

7. An optical system having an entrance aperture and an optical axis, comprising: an objective lens; a collimating lens, said collimating lens and objective lens being disposed on said optical axis for said optical system, said collimating lens acting as a collimator for principal rays passing through the optical center of said objective lens, said collimated principal rays being parallel to said optical axis; a third lens disposed in said optical system at an inclined angle to said optical axis; a transparent plate, said plate having light transmission surfaces parallel to one another and inclined at an angle to said optical axis, said third lens and said inclined plate each being inclined at any instant at the same angle and direction relative to the optical axis; means for rotating said third lens and said inclined plate about said optical axis; means for displaying images formed as a result of light traversing said objective lens, said collimating lens, said third lens and said inclined plate of said optical system; a device responsive to electromagnetic radiation; and a fourth lens arranged between said display means and said responsive device to image the entrance aperture upon said responsive device.

8. An optical system having an entrance aperture and an optical axis, comprising: an objective lens; a second lens disposed in said optical system at an inclined angle to said optical axis; a transparent plate disposed in said optical system at an inclined angle to said optical axis which is equal in magnitude to the angle of said second lens, said second lens and said transparent plate both being inclined in the same direction, said objective lens and said second lens and said transparent plate being disposed on said optical axis; means for rotating said second lens and said transparent plate about said optical axis together; said second lens being so disposed and arranged as to compensate for aberration introduced by said transparent plate, said second lens being so disposed and arranged as to make principal rays entering said optical system through its optical center parallel to said optical axis of the system; a device responsive to electromagnetic radiation; and a third lens arranged between said responsive device and said transparent plate, whereby the image of the entrance aperture is focused upon said responsive device.

References Cited in the file of this patent

UNITED STATES PATENTS

| | | |
|---|---|---|
| 1,145,022 | Keuffel | July 6, 1915 |
| 2,538,209 | Offner | Jan. 16, 1951 |
| 2,884,540 | Shockley | Apr. 28, 1959 |
| 2,928,952 | Bednarz | Mar. 15, 1960 |

FOREIGN PATENTS

| | | |
|---|---|---|
| 211,169 | Great Britain | Oct. 16, 1924 |
| 656,011 | Great Britain | Aug. 8, 1951 |
| 1,165,448 | France | June 9, 1958 |